United States Patent [19]

Zaltieri et al.

[11] 4,255,063
[45] Mar. 10, 1981

[54] ELECTROMAGNETIC LINE SPACING DEVICE

[75] Inventors: Adriano Zaltieri, Ivrea; Giuseppe Coli, Banchette, both of Italy

[73] Assignee: Ing. C. Olivetti & C., S.p.A., Ivrea, Italy

[21] Appl. No.: 920,060

[22] Filed: Jun. 28, 1978

[30] Foreign Application Priority Data

Jul. 4, 1977 [IT] Italy .............................. 68540 A/77

[51] Int. Cl.³ .......................................... B41J 19/76
[52] U.S. Cl. .................................. 400/568; 400/611; 400/659
[58] Field of Search ..................... 400/545, 555, 556.2, 400/559, 559.1, 560.1, 565, 568, 569, 571, 577, 611, 641, 659, 902, 903

[56] References Cited

U.S. PATENT DOCUMENTS

| 779,063 | 1/1905 | Benicke et al. .................... 400/568 |
| 2,203,024 | 6/1940 | Lewis et al. .................... 400/568 X |
| 2,234,262 | 3/1941 | Lake ................... 400/611 X |
| 3,014,570 | 12/1961 | Cunningham .................. 400/611 X |
| 3,048,253 | 8/1962 | Oldenburg et al. ............. 400/568 X |
| 3,315,860 | 4/1967 | Adams et al. .................... 400/568 X |
| 3,880,016 | 4/1975 | Jamieson et al. ................ 400/569 X |
| 4,088,214 | 5/1978 | Shindo et al. ................... 400/568 X |

*Primary Examiner*—Ernest T. Wright, Jr.
*Attorney, Agent, or Firm*—Schuyler, Banner, Birch, McKie & Beckett

[57] ABSTRACT

A platen for a typewriter, is rotated intermittently by pulsing a winding to establish flux between poles of a stator and a rotor, which rotates through a fixed angle and then back to a datum position under the action of a spring. The magnetic flux also engages an electro magnetic clutch formed by the rotor and a part rotationally fast with the platen so that the platen is rotated only during the forward rotation of the rotor. The stator, rotor and said part are all coaxial with the platen and may be housed inside the platen.

2 Claims, 4 Drawing Figures

ELECTROMAGNETIC LINE SPACING DEVICE

BACKGROUND OF THE INVENTION

The present invention relates to an automatic line-spacing device for a platen for printing office machines.

Devices are known wherein automatic line-spacing of a platen is obtained by utilizing the drive either of the main motor of the machine or of an auxiliary motor connected to the platen through gears or clutches. In these devices, the connecting elements between the motor and platen are generally bulky, complex and costly.

SUMMARY OF THE INVENTION

A first object of the present invention is to provide an automatic line-spacing device for a platen which is of small dimensions, simple and of relatively low cost.

In accordance with this object, the invention provides an automatic line-spacing device for a platen, comprising the platen, and a drive unit comprising a rotor coaxial with the platen, means operable to rotate the rotor through an angle corresponding to a line-spacing step, and means operable to couple the rotor to the platen while such rotation takes place.

A second object of the invention is to provide a device for controlling driven elements having an intermittent movement which is simple and compact and for use predominantly, but not exclusively, in the field of office machines.

In accordance with this object the invention provides an electromagnetic device for effecting intermittent rotational advance of a driven element from a driving element having an oscillatory rotational movement, comprising a ferromagnetic rotor forming the driving element and having a plurality of poles, a ferromagnetic stator having a plurality of poles, means biasing the rotor to a datum rotational position, a winding energisable by a current pulse to establish a magnetic flux between the poles of the rotor and the stator so as to rotate the rotor through a predetermined angle from the datum position, to which the rotor returns when the current pulse ends, and a unidirectional coupling between the rotor and the driven element such that the driven element rotates with the rotor for one sense only of rotation of the rotor.

BRIEF DESCRIPTION OF THE DRAWING

The invention will now be described in more detail, by way of example with reference to the accompanying drawing, in which.

DETAILED DESCRIPTION OF TWO PREFERRED EMBODIMENTS

Figure 1:
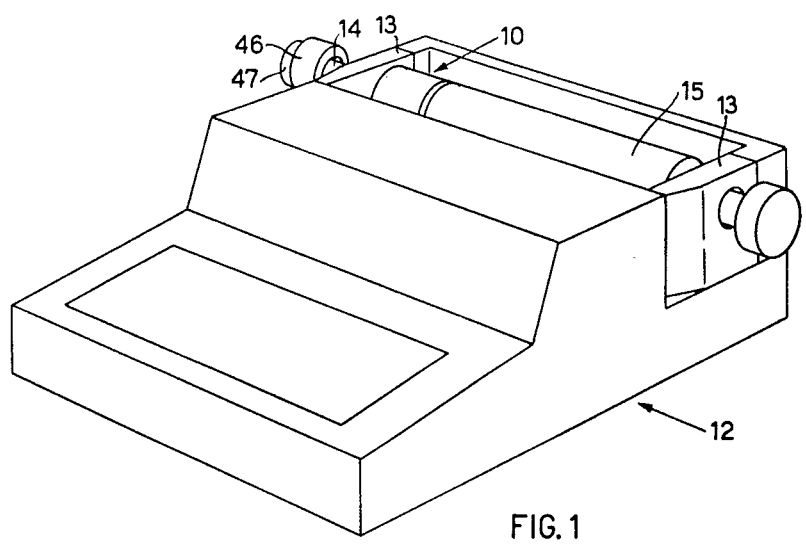
FIG. 1 is a perspective view of a printing office machine including an automatic line-spacing device embodying the invention.

The line-spacing device 10 embodying the invention is fitted in a printing machine 12 (FIG. 1) of known type (.e.g. a typewriter) provided with two side pieces 13 in which a platen 15 is mounted rotatably and removably by means of its shaft 14.

Figure 3:
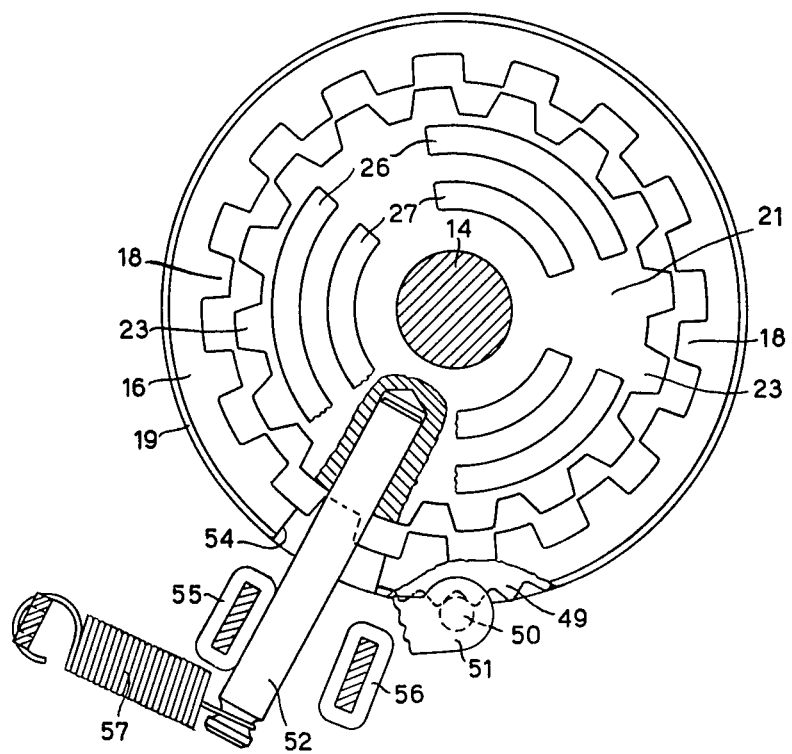
FIG. 3 is a section on the line 3—3 of FIG. 2.
Figure 2:
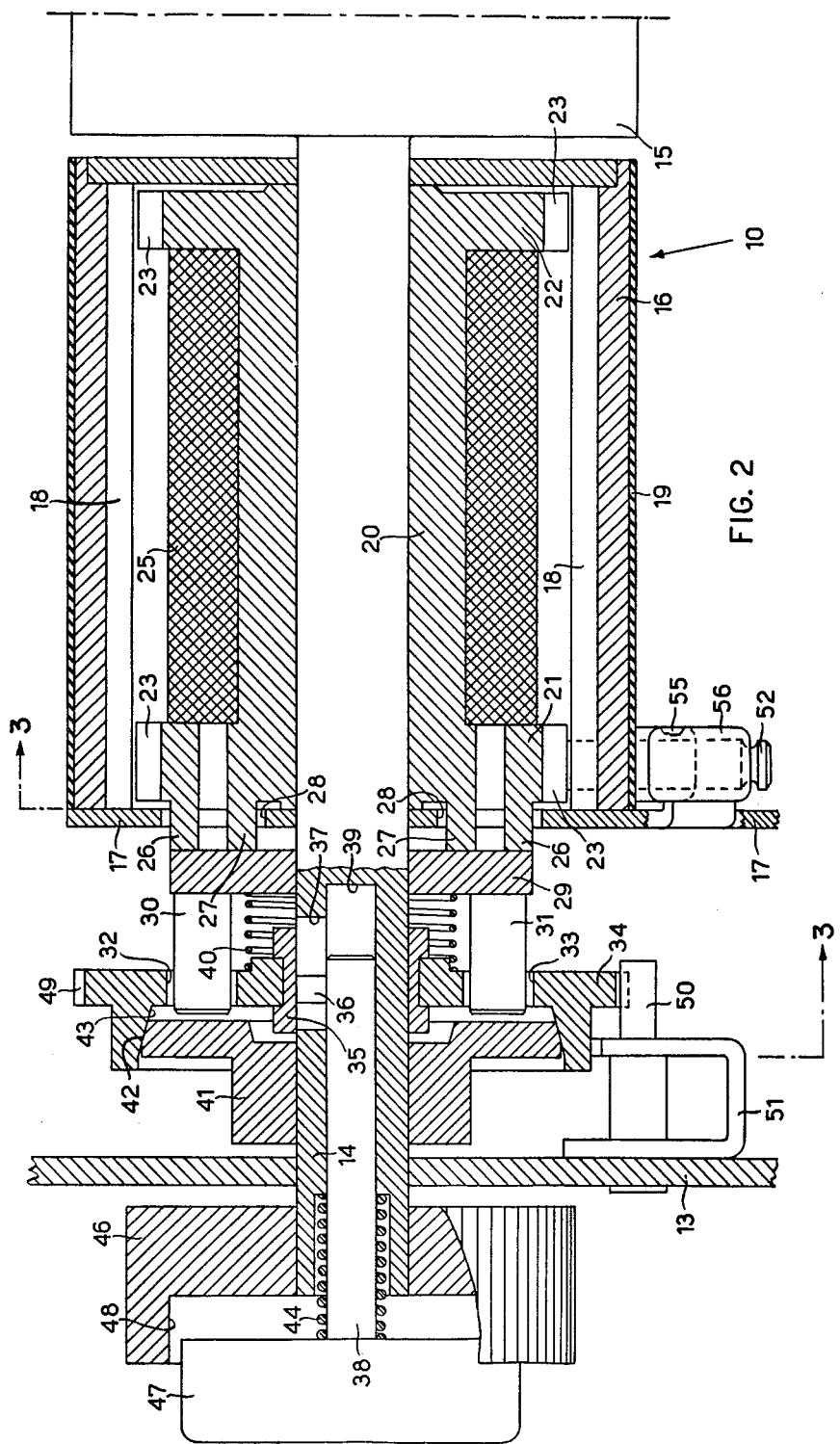
FIG. 2 is a side view, partly in section, of the device embodying the invention.

The line-spacing device 10 (FIG 2.) comprises a cylindrical stator 16 of ferromagnetic material, for example sintered iron, fixed to an auxillary side piece 17 of the machine 12. The stator 16 is coaxial with the shaft 14 and is shaped so as to have a plurality of inwardly projecting pole pieces 18 (FIGS. 2 and 3). Moreover, the stator 16 is covered on the outside with a layer of rubber 19 which has a diameter equal to the diameter of the platen 15.

Inside the stator 16 there is arranged a rotor 20 mounted rotatably with respect to the shaft 14 and shaped so as to have two flanges 21 and 22 each having at its periphery pole pieces 23 associated with the pole pieces 18 of the stator 16. Between the two flanges 21 and 22 there is arranged a winding 25 which is selectively energizable to produce a magnetic flux beteen the pole pieces 18 and 23. The rotor 20 is also of ferromagnetic material, for example pure iron, while the flanges 21 and 22 may also be of sintered iron.

The flange 21 is shaped so as to have a pair of circular sectors 26 and 27 which project from the stator 16 through circular slots 28 in the side piece 17. Against the sectors 26 and 27 bears a metal disc 29, which is mounted rotatably on the shaft 14 and is provided with two diametrically opposed pins 30 and 31.

The pins 30 and 31 are seated in two corresponding slots 32 and 33, respectively, in a wheel 34 mounted rotatably on a bush 35 which is mounted in turn on the shaft 14 and can slide axially with respect to the latter. A spring 40 is compressed between the disc 29 and the wheel 34.

A spindle 38 is mounted to slide axially in a central bore 39 of the shaft 14 and is connected to the bush 35 by means of a pin 36 seated in an axial slot 37 in the shaft 14.

On shaft 14 there is keyed a wheel 41 which has a frustoconical outer surface 42 adapted to mate with a corresponding and also frustoconical inner surface 43 of the wheel 34; a spring 44 coaxial with the spindle 38 normally keeps the wheel 34 coupled with the wheel 41.

At the left-hand of the shaft 14 there is fixed a knob 46 for manual line-spacing of the platen 15. A knob 47 fixed to the outer end of the spindle 38 is partially seated in a cavity 48 of the knob 46.

On the outside, the wheel 34 is provided with a ring gear 49, with the teeth of which the pin 50 of a spring-loaded positioning detent 51 of known type is adapted to co-operate.

A pin 52 is fixed to the flange 21 of the rotor 20 and projects raidally from the stator 16 through an aperture 54 therein. The pin 52 is movable between two fixed rubber pads 55 and 56 and is normally held against the rubber pad 55 by a spring 57. To reduce cost and for high efficiency of the device 10, the disc 29 and the wheels 34 and 41 may be made of sintered iron.

The line spacing device 10 hereinbefore described operates in the following manner. In the inoperative position, the winding 23 is deenergized and the rotor 20 (FIG. 3), pulled by the spring 57, is located with its pole pieces 23 offset with respect to the pole pieces 18 of the stator 16. In this position, moreover, the spring 44 (FIG. 2) keeps the wheels 34 and 41 coupled to each other and the spring 40 keeps the disc 29 bearing against the circular sectors 26 and 27 of the rotor 20. Let it be assumed that it is desired to effect line-spacing of the platen 15 of the printing machine 12 automatically. The winding 25 is energised by sending in any known manner a predetermined current pulse, for example with a duration of 50 msec., to generate a magnetic flux between the rotor 20 and the stator 16. Owing to the effect of the generated flux, the pole pieces 23 of the rotor 20 are brought in alignment with the pole pieces 18 of the stator 16, thus producing an anticlockwise rotation of the rotor 20 (in FIG. 3) with respect to the stator 16. The amplitude of the rotation is defined by the pin 52, which is arrested against the fixed rubber pad 56, and represents an elementary line-spacing step equal to half a line. Moreover, the generated flux, linking up between the circular sectors 26 and 27 through the disc 29, renders the rotor 20 fast with the disc 29. In this way, the disc 29 is also rotated together with the rotor 20.

By means of its pins 30 and 31, the disc 29 causes the wheel 34 to rotate on the bush 35 and, with it, the wheel 41 and the platen 15, effecting in this way an elementary line-spacing step. The positioning detent 51 positions its pin 50 in the next tooth of the ring gear 49, thus setting the platen 15 in a position corresponding to half a line-spacing step.

The winding 25 is then deenergised and the spring 57 brings the rotor 20 back to the inoperative position. During the clockwise rotation of the rotor 20, however, the disc 29 is not entrained. The linking flux between the sectors 26 and 27 is absent and the frictionally generated force between the disc 29 and rotor 20 produced by the spring 40 is insufficient to overcome the action of the positioning detent 51 on the wheel 34.

For larger line-spacings, immediately after the return of the rotor 20 to the inoperative position a fresh pulse is sent to the winding 25 to effect in this way a fresh elementary cycle in a similar manner to that already described.

If it is desired to uncouple the platen 15 from the automatic line-spacing device 10, the knob 47 is pushed manually to the right in opposition to the action of the spring 44. In this way, the bush 35 and the wheel 34 are also shifted to the right and, more particularly, uncoupling of the wheels 34 and 41 is obtained. The platen 15 can thus be rotated freely by acting on the knob 46, while the wheel 34 remains stationary, being positioned by the positioning detent 51.

Figure 4:
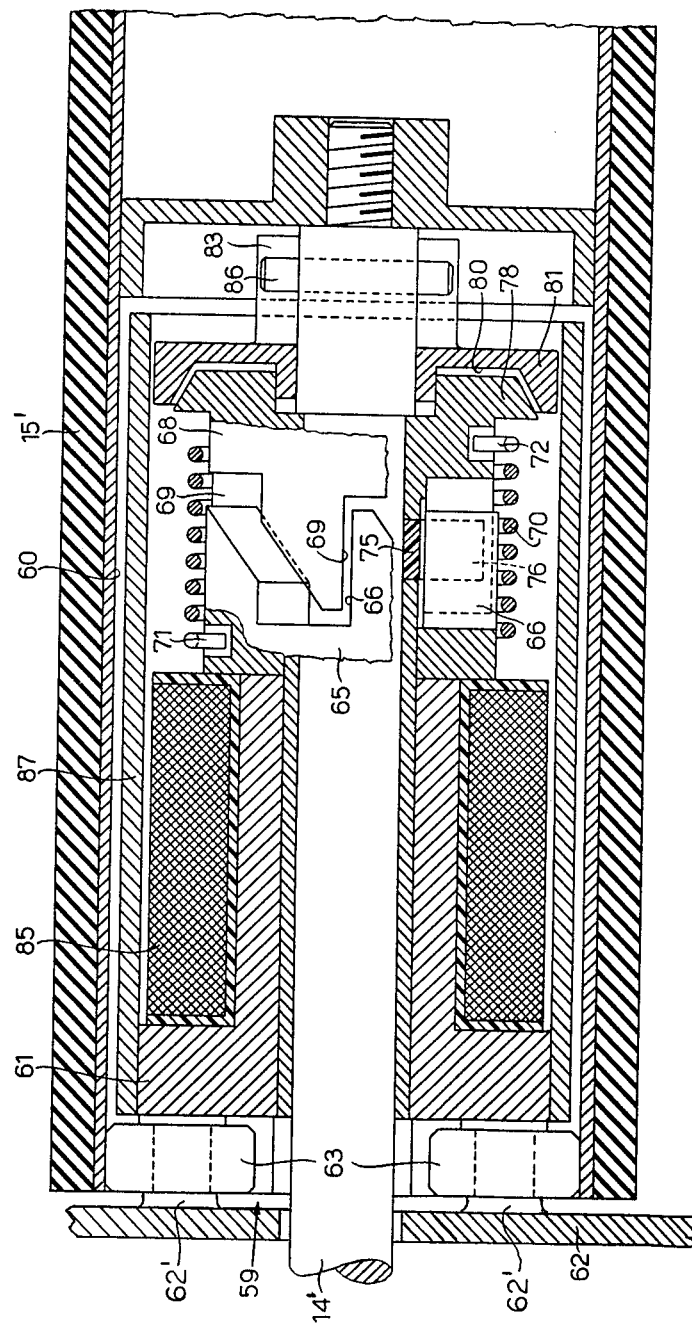
FIG. 4 is a side view, partly in section, of a modified embodiment of the invention.

Instead of the line-spacing device being disposed at the side of the platen, it may be arranged inside the platen itself. By way of example, FIG. 4 illustrates a modified form of the device hereinbefore described. In this modified construction, a platen 15' is provided with a cylindrical cavity 60 inside which there is arranged a drive unit 59 comprising a stator 61 of ferromagnetic material fixed to a side wall 62 of the machine by means of a plurality of stationary stems 62'. On the stationary stems 62' are rotatably mounted rollers 63 supporting the left hand end of the platen 15'. The Stator 61 is coaxial with a shaft 14' and has an inner end 65 shaped so as to have four axial pole pieces 66 spaced at intervals of 90°.

A rotor 68 of ferromagnetic material is also arranged coaxially with the shaft 14' and is shaped so as to have four pole pieces 69 disposed facing the corresponding fixed pole pieces 66. A coil spring 70, which has one end 71 fixed to the stator 61 and one end 72 fixed to the rotor 68, normally keeps the pole pieces 69 spaced in between the fixed pole pieces 66. A bush 75 of plastics material has a radial dog 76 interposed between the pole pieces 66 and 69 to limit the relative rotation under the action of the spring 70, and thereby to define the length of the air gap between the pole pieces 66 and 69, when there is no magnetic flux between the pole pieces 66 and 69.

Around the stator 61 there is arranged an energising coil 85 adapted to produce a magnetic flux between the fixed pole pieces 66 and the pole pieces 69 of the rotor 68.

The rotor 68 is shaped so as to have a frustoconical end 78 which is housed in a corresponding frustoconical cavity 80 of a bush 81 of ferromagnetic material coaxial with the shaft 14'. The bush 81 has a radial slot 83 in which is seated a pin 86 fixed to the shaft 14'.

A cylindrical sleeve 87 of ferromagnetic material is arranged inside the cavity 60 coaxially with the shaft 14' and has one of its ends fixed to the stator 61 and the other end surrounding the bush 81, thereby completing a pot-type magnetic circuit.

The drive unit 59 effects line-spacing of the platen 15' in the following manner. When the coil 85 is energized, a magnetic flux is generated and causes the rotor 68 to rotate with respect to the stator 61 in opposition to the action of the spring 70 and through such angle as is permitted by the dog 76. Moreover, the generated flux, linking up between the frustoconical part 78 of the rotor 68 and the bush 81, renders the latter fast with the rotor 68 itself. In this way, the shaft 14' and the platen 15' also rotate, effecting an elementary line-spacing operation. On deenergization of the coil 85, the rotor 68 returns to its operative position, while the bush 81 and the shaft 14' remain in the position which has been reached, in a similar manner to that hereinbefore described.

We claim:

1. An electromagnetic line-spacing device for a platen, comprising a ferromagnetic stator having a substantially cylindrical form and comprising first pole pieces radially disposed; a ferromagnetic rotor of cylindrical form, rotably mounted with respect to said stator, said ferromagnetic rotor comprising second pole pieces radially disposed in front of said first pole pieces, and third pole pieces frontally disposed; a ferromagnetic disc connected to said platen for rotating therewith and disposed in front of said third pole pieces; and a winding energizable for generating a magnetic flux crossing simultaneously said first, second and third pole pieces and said ferromagnetic disc, for producing a rotational movement of said ferromagnetic rotor with respect to said ferromagnetic stator, and the simultaneous coupling of said ferromagnetic rotor of said ferromagnetic disc connected to said platen for causing a rotation of said platen when said winding is energized.

2. An electromagnetic line-spacing device for a platen, comprising:
   support means for rotatably supporting said platen;
   a ferromagnetic stator fixedly mounted on said support means coaxial to said platen, said ferromagnetic stator comprising a tubular opening and stator pole pieces projecting inwardly of said tubular opening;
   a ferromagnetic rotor rotatably mounted inside said ferromagnetic stator coaxial to said platen, said ferromagnetic rotor comprising a central body, two flanges disposed parallel therebetween laterally to said central body and each one of said flanges having rotor pole pieces faced to said stator pole pieces for defining annualar gaps;
   a winding coaxially mounted on said central body and energizable for generating a magnetic flux on said annular gaps for producing a rotational movement of said ferromagnetic rotor with respect to said ferromagnetic stator;
   a pair of frontal pole pieces provided on one of said two flanges and having pole surfaces parallel to said flanges;

a ferromagnetic disc connected to said platen for rotating therewith and disposed parallel to said flanges into contact with said frontal pole pieces in manner such that when said winding is energized a portion of said magnetic flux crosses also said frontal pole pieces and said ferromagnetic disc, magnetically coupling said ferromagnetic rotor to said ferrromagnetic disc;

urging means for urging said ferromagnetic disc towards said frontal pole pieces, ensuring a constant contact therebetween also in absence of said portion of magnetic flux;

positioning means for positioning said ferromagnetic rotor in a predetermined rest position;

returning means connected to said ferromagnetic rotor for returning said ferromagnetic rotor to said rest position after the energisation of said winding; and stopping means for holding said ferromagnetic disc and said platen stopped while said ferromagnetic rotor returns towards said rest position.

* * * * *